(12) United States Patent
Gao (10) Patent No.: US 10,529,340 B2
(45) Date of Patent: Jan. 7, 2020

(54) VOICEPRINT REGISTRATION METHOD, SERVER AND STORAGE MEDIUM

(71) Applicant: BAIDU ONLINE NETWORK TECHNOLOGY (BEIJING) CO., LTD, Beijing (CN)

(72) Inventor: Cong Gao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/045,865

(22) Filed: Jul. 26, 2018

(65) Prior Publication Data
US 2019/0066695 A1   Feb. 28, 2019

(30) Foreign Application Priority Data

Aug. 23, 2017  (CN) .......................... 2017 1 0729316

(51) Int. Cl.
  *G10L 17/22*   (2013.01)
  *G10L 21/0232*  (2013.01)
  *G10L 17/06*   (2013.01)
  *G10L 21/02*   (2013.01)
  *G10L 17/02*   (2013.01)
  *G10L 17/04*   (2013.01)
  *G10L 17/18*   (2013.01)
  *G10L 21/0208* (2013.01)

(52) U.S. Cl.
  CPC .............. *G10L 17/22* (2013.01); *G10L 17/02* (2013.01); *G10L 17/04* (2013.01); *G10L 17/06* (2013.01); *G10L 21/0205* (2013.01); *G10L 21/0232* (2013.01); *G10L 17/18* (2013.01); *G10L 21/0208* (2013.01)

(58) Field of Classification Search
  CPC . G10L 17/22; G10L 21/0232; G10L 21/0205; G10L 17/06; G10L 17/02; G10L 17/18; G10L 21/0208
  USPC ........................................................ 704/232
  See application file for complete search history.

(56) References Cited

U.S. PATENT DOCUMENTS

| | | | | |
|---|---|---|---|---|
| 2011/0080260 A1* | 4/2011 | Wang | ...................... | G06F 21/32 340/5.83 |
| 2013/0225128 A1* | 8/2013 | Gomar | .................. | H04W 12/06 455/411 |
| 2014/0163978 A1* | 6/2014 | Basye | ..................... | G10L 15/28 704/233 |
| 2014/0200890 A1* | 7/2014 | Kurniawati | ........... | G10L 15/144 704/236 |

* cited by examiner

*Primary Examiner* — Bharatkumar S Shah (57) ABSTRACT

Embodiments of the present disclosure provide a voiceprint registration method, a server and a storage medium. The method may include: acquiring present speech information collected by a smart device; extracting a present voiceprint feature of the present speech information; determining whether the present voiceprint feature is a voiceprint feature associated with the smart device; and determining the present voiceprint feature as a user identification associated with the smart device to determine the present voiceprint feature as the voiceprint feature associated with the smart device, in response to determining that the present voiceprint feature is not the voiceprint feature associated with the smart device.

18 Claims, 3 Drawing Sheets

--- acquiring present speech information collected by a smart device, extracting a present voiceprint feature from the present speech information — S110 determining whether the present voiceprint feature is a voiceprint feature associated with the smart device — S120 when the present voiceprint feature is not the voiceprint feature associated with the smart device, determining the present voiceprint feature as a user identification associated with the smart device to determine the present voiceprint feature as the voiceprint feature associated with the smart device — S130

# VOICEPRINT REGISTRATION METHOD, SERVER AND STORAGE MEDIUM

CROSS-REFERENCE TO RELATED APPLICATIONS

This application is based on and claims priority of Chinese Patent Application No. 201710729316.8, filed on Aug. 23, 2017, the entire contents of which are incorporated herein by reference.

TECHNICAL FIELD

The present disclosure relates to voice recognition technologies, and more particularly relates to a voiceprint registration method, a server and a storage medium.

BACKGROUND

With development of artificial intelligence technology, the speech recognition technology develops quickly and is used widely. As identification ability and accuracy of the voiceprint recognition are improved gradually, the voiceprint recognition, together with the fingerprint recognition and face recognition, is used widely in various fields such as security and protection, information collection.

In prior art, the voiceprint registration is a registration based on a fixed procedure. For example, when the voiceprint registration is performed using a near field device, a configuration needs to be performed via an application on the phone. According to the prompt on the phone, the registration is completed by performing corresponding operations. During this procedure, the user needs to read repeatedly text displayed on the mobile terminal. When the voiceprint registration is performed using a far field device, the user firstly initiates a command, the smart device launches a registration mode after receiving the command. During this procedure, the user also needs to read repeatedly specified text to complete the registration. In other words, the voiceprint registration in the prior art is performed according to fixed registration procedure, which is complex to implement, such that it is difficult for the user to perform corresponding operations thus causing a low usage.

SUMMARY

Embodiments of the present disclosure provide a voiceprint registration method, a server and a storage medium.

A first aspect of embodiments of the present disclosure provides a voiceprint registration method. The method including acquiring present speech information collected by a smart device; extracting a present voiceprint feature of the present speech information; determining whether the present voiceprint feature is a voiceprint feature associated with the smart device; and determining the present voiceprint feature as a user identification associated with the smart device to determine the present voiceprint feature as the voiceprint feature associated with the smart device, in response to determining that the present voiceprint feature is not a voiceprint feature associated with the smart device.

A second aspect of embodiments of the present disclosure provides a voiceprint registration apparatus. The apparatus includes: a voiceprint feature extracting module, configured to acquire present speech information collected by a smart device and to extract a present voiceprint feature of the present speech information; a voiceprint feature recognition module, configured to determine whether the present voiceprint feature is a voiceprint feature associated with the smart device; and a voiceprint feature associating module, configured to determine the present voiceprint feature as a user identification associated with the smart device to determine the present voiceprint feature as the voiceprint feature associated with the smart device, in response to determining that the present voiceprint feature is not a voiceprint feature associated with the smart device.

A third aspect of embodiments of the present disclosure provides a server. The server includes: one or more processors, a memory having one or more programs stored thereon. When the one or more programs are executed by the one or more processors, the one or more processors are caused to perform the method according to the first aspect of the embodiments.

A fourth aspect of embodiments of the present disclosure provides a computer readable storage medium having computer programs, that when executed by a processor, cause the processor to perform the method according to the first aspect of embodiments of the present disclosure.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. Also it should be noted that, for convenience of description, the accompanying drawings illustrate only the part related to the present invention, instead of the entire contents.

First Embodiment

Figure 1:
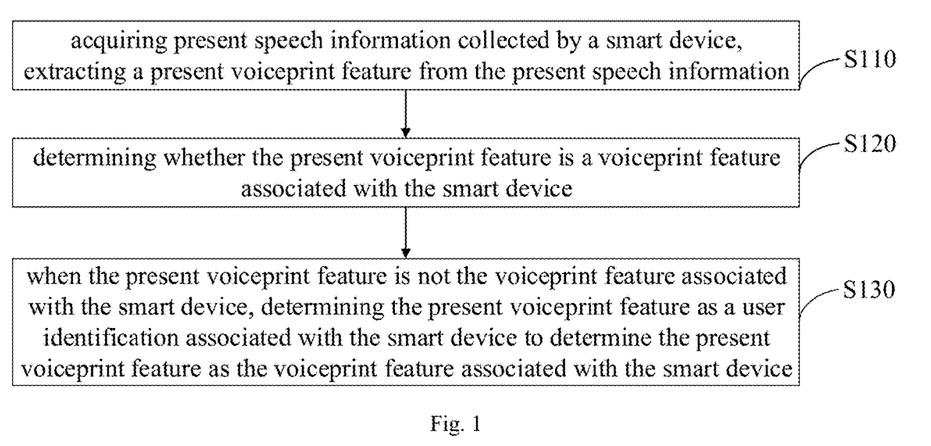
FIG. 1 is a flow chart illustrating a voiceprint registration method according to a first embodiment of the present disclosure.

FIG. 1 is a flow chart illustrating a voiceprint registration method according to the first embodiment of the present disclosure. This embodiment is applicable to a case of using voiceprint of a user. The method can be executed by a voiceprint registration apparatus, which can be implemented in the form of software and/or hardware. For example, the voiceprint registration apparatus can be provided in a server. As illustrated in FIG. 1, the method may include the followings.

At block S110, present speech information collected by a smart device is acquired, a present voiceprint feature is extracted from the present speech information.

In detail, in an interaction between a user and the smart device via speech, the user determines speech content according to the own requirements. The smart device collects the present speech information input by the user, processes the present speech information and extracts the voiceprint feature from the present speech information. In this embodiment, collected analog speech signals are quantized and sampled to acquire digital speech signals, which are subject to denoising and filtering to produce processed speech signals. A feature extraction is performed on the processed speech signals using a predetermined algorithm to acquire the voiceprint feature of the present speech information.

At block S120, it is determined whether the present voiceprint feature is a voiceprint feature associated with the smart device.

After acquiring the present voiceprint feature, the present voiceprint feature is matched with a voiceprint feature associated with the smart device to determine whether the present voiceprint feature is the voiceprint feature associated with the smart device. If the smart device is an unused device, the voiceprint feature associated with the smart device is null. If the smart device is a used device, the voiceprint feature associated with the smart device belongs to a historical user of the smart device.

In detail, by matching the present voiceprint feature with the voiceprint features associated with the smart device, when the present voiceprint feature is matched successfully with one of the voiceprint features associated with the smart device, the present speech information comes from a historical user of the smart device. When the present voiceprint feature does not match with each of the voiceprint features associated with the smart device, the voiceprint feature is not the voiceprint feature associated with the smart device, the present speech information comes from a new user. The voiceprint feature can be identified in many ways, for example, by comparing the present voiceprint feature with an established voiceprint feature model to identify the present voiceprint feature, or by using a neural network algorithm, such as a dynamic time warping (DTW) algorithm, a hidden Markov model (HMM), a Gaussian mixture model (GMM) or the like.

At block S130, when the present voiceprint feature is not the voiceprint feature associated with the smart device, the present voiceprint feature is determined as a user identification associated with the smart device to determine the present voiceprint feature as the voiceprint feature associated with the smart device.

In detail, when the present voiceprint feature is not the voiceprint feature associated with the smart device, i.e., the present voiceprint feature is not associated with the smart device, the present voiceprint feature is determined as the user identification associated with the smart device, so as to set the present voiceprint feature as the voiceprint feature associated with the smart device, for example, it is determined that the present voiceprint feature belongs to a user N of the smart device, N is an integer. After the present voiceprint feature is determined as the user identification associated with the smart device, user behavior data produced during the process of using the smart device by the user having the voiceprint feature is associated with the user identification. In addition, a voiceprint feature model corresponding to the present voiceprint feature can be established for subsequent identification of collected voiceprint features.

In this embodiment of the present disclosure, the present speech information collected by the smart device is acquired, the present voiceprint feature is extracted from the present speech information, it is determined whether the present voiceprint feature is a voiceprint feature associated with the smart device, if no, the present voiceprint feature is determined as a user identification associated with the smart device to determine the present voiceprint feature as the voiceprint feature associated with the smart device. In this way, the voiceprint feature can be determined as the user identification associated with the smart device without specified operations of the user, thus increasing convenience of using the voiceprint feature.

Second Embodiment

Figure 2:
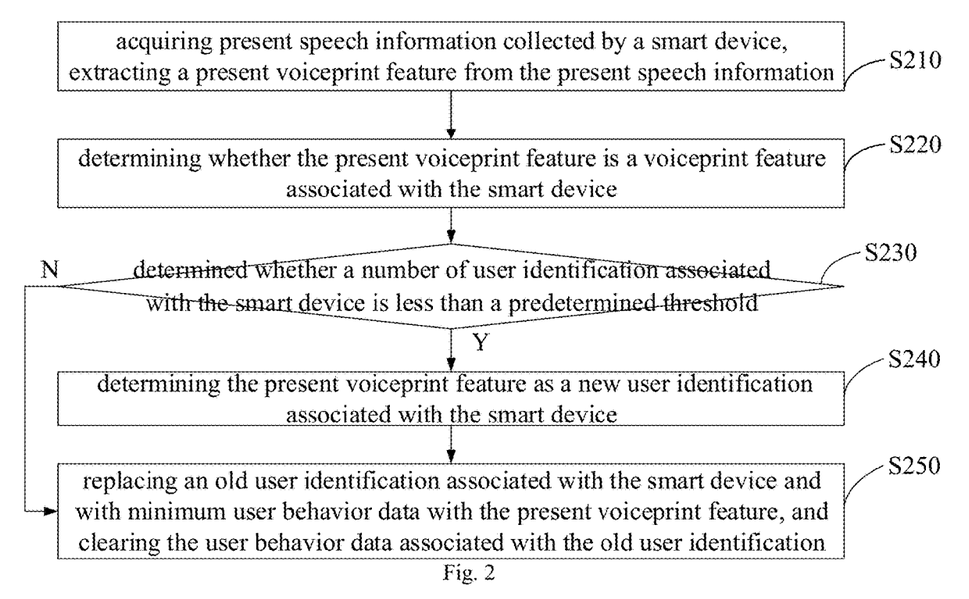
FIG. 2 is a flow chart illustrating a voiceprint registration method according to a second embodiment of the present disclosure.

FIG. 2 is a flow chart illustrating a voiceprint registration method according to the second embodiment of the present disclosure. As illustrated in FIG. 2, the method may include the followings.

At block S210, present speech information collected by a smart device is acquired, a present voiceprint feature is extracted from the present speech information.

At block S220, it is determined whether the present voiceprint feature is a voiceprint feature associated with the smart device, if yes, a response is made to the present speech information.

At block S230, when the present voiceprint feature is not the voiceprint feature associated with the smart device, it is determined whether a number of user identification associated with the smart device is less than a predetermined threshold, if yes, an act at block S240 is executed, if no, an act at block S250 is executed.

When the present voiceprint feature is not the voiceprint feature associated with the smart device, the present voiceprint feature is determined the user identification associated with the smart device. In order to guarantee the accuracy of using the voiceprint feature in the smart device, the number of user identifications that can be associated with the smart device via the voiceprint feature is limited, i.e., a threshold is set for the number of user identifications associated with the smart device in advance. When determining the present voiceprint feature as the user identification to be associated with the smart device, it is determined whether the number of user identifications associated with the smart device is less than the preset threshold, to determine whether the present voiceprint feature can be set as a new user identification which can be added in the smart device directly to be associated with the smart device. In an embodiment, the preset threshold is 10.

At block S240, the present voiceprint feature is determined as a new user identification associated with the smart device.

When the number of user identifications associated with the smart device is less than the preset threshold, it indicates that the smart device can add the present voiceprint feature as the new user identification to be associated with the smart device. In this case, the present voiceprint feature is added in the smart device, and is determined as the new user identification associated with the smart device.

At block S250, an old user identification associated with the smart device and with minimum user behavior data is replaced with the present voiceprint feature, and the user behavior data associated with the old user identification is cleared.

When the number of user identifications associated with the smart device is not less than the preset threshold, it indicates that the number user identification associated with the smart device via the voiceprint feature reaches an upper limit, the present voiceprint feature cannot be added directly and determined as a new user identification associated with the smart device. In this case, the old user identification associated with the smart device and with minimum user behavior data is replaced with the present voiceprint feature, and the user behavior data associated with the old user identification is clear.

In this embodiment, the details of determining the present voiceprint feature as the user identification associated with the smart device to determine the present voiceprint feature as the voiceprint feature associated with the smart device are described. In this way, the accuracy of using the voiceprint feature in the smart device can be guaranteed, the voiceprint feature can be determined as the user identification associated with the smart device without specified operations of the user, thus increasing convenience of using the voiceprint feature.

Third Embodiment

Figure 3:
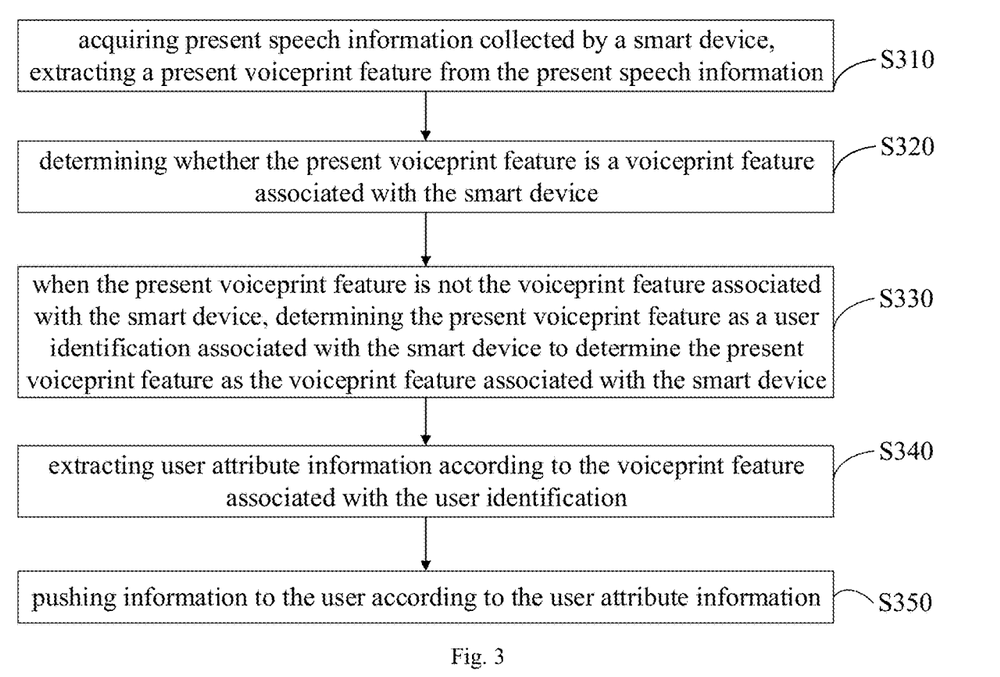
FIG. 3 is a flow chart illustrating a voiceprint registration method according to a third embodiment of the present disclosure.

FIG. 3 is a flow chart illustrating a voiceprint registration method according to the third embodiment of the present disclosure. This embodiment is optimized on the basis of the aforementioned embodiments. As illustrated in FIG. 3, the method may include the followings.

At block S310, present speech information collected by a smart device is acquired, a present voiceprint feature is extracted from the present speech information.

At block S320, it is determined whether the present voiceprint feature is a voiceprint feature associated with the smart device.

At block S330, when the present voiceprint feature is not the voiceprint feature associated with the smart device, the present voiceprint feature is determined as a user identification associated with the smart device to determine the present voiceprint feature as the voiceprint feature associated with the smart device.

At block S340, user attribute information is extracted according to the voiceprint feature associated with the user identification.

In this embodiment, by recognizing the voiceprint feature, information of the user such as gender, age group or the like corresponding to voiceprint feature can be determined. In detail, the user corresponding to the voiceprint feature can be identified as male or female, an orphan or an adult or the like, and the identification result is added in the user attribute information corresponding to the voiceprint feature.

At block S350, information is pushed to the user according to the user attribute information.

In detail, the information can be pushed to the user according to the user attribute information. In an implementation, a database storing the user attribute information and the information to be pushed is established in advance. After the user attribute information is determined, the information to be pushed corresponding to the user attribute information can be searched in the database, and then is pushed to be displayed on the smart device or played by the smart device.

For example, when the present user attribute information is identified as female orphan, the information to be pushed, such as children's story, children's song, corresponding to female orphan can be searched in the database, and audio and/or video classified as the children's story and children's song can be pushed to the smart device for displaying or playing.

In this embodiment, based on the aforementioned embodiments, the user attribute information is extracted according to the voiceprint feature associated with the user identification, and the information is pushed to the user according to the user attribute information. In this way, the voiceprint feature can be determined as the user identification associated with the smart device without specified operations of the user, thereby increasing convenience of using the voiceprint feature, and further the personalized information can be pushed to the user according to the user attribute information, thereby improving the user experience.

Fourth Embodiment

Figure 4:
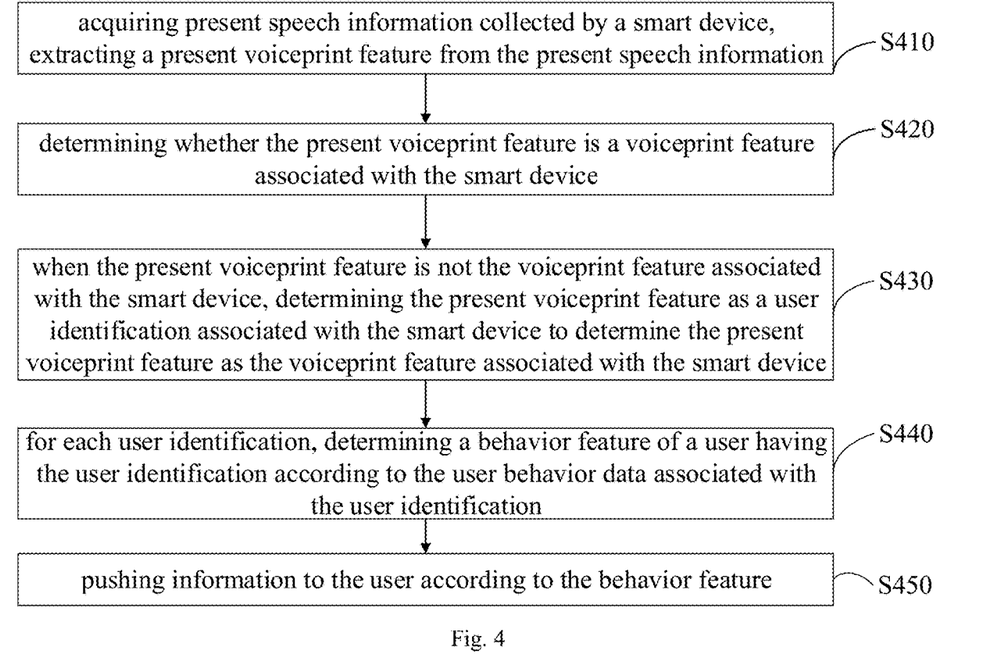
FIG. 4 is a flow chart illustrating a voiceprint registration method according to a fourth embodiment of the present disclosure.

FIG. 4 is a flow chart illustrating a voiceprint registration method according to the fourth embodiment of the present disclosure. This embodiment is optimized on the basis of the aforementioned embodiments. As illustrated in FIG. 4, the method may include the followings.

At block S410, present speech information collected by a smart device is acquired, a present voiceprint feature is extracted from the present speech information.

At block S420, it is determined whether the present voiceprint feature is a voiceprint feature associated with the smart device.

At block S430, when the present voiceprint feature is not the voiceprint feature associated with the smart device, the present voiceprint feature is determined as a user identification associated with the smart device to determine the present voiceprint feature as the voiceprint feature associated with the smart device.

At block S440, for each user identification, a behavior feature of a user having the user identification is determined according to the user behavior data associated with the user identification.

In this embodiment, for each user identification, the behavior feature of a user having the user identification can be determined according to the user behavior data associated with the user identification. For example, when the user uses the smart device, the operations of the user are recorded in real time, the user behavior data can be determined according to the operations and the behavior feature of the user is determined according to the user behavior data. In an embodiment, a user preference model can be established in advance. The behavior feature of the user can be determined according to the user behavior data and the user preference model. The user behavior data can be a name of a song requested by the user, a singer of the song, a category of the song or the like, or can be a type of video watched by the user, a time period of the video.

For example, the category of songs preferred by the user can be determined according to the category of songs frequently requested by the user. When the name of the song frequently requested by the user is "Sweet honey", "love", "dream seeker" or the like, the category of preferred songs of the user can be determined as "reminiscence" and added in the behavior feature of the user.

At block S450, the information is pushed to the user according to the behavior feature.

In detail, the information can be pushed to the user according to the behavior feature. For example, when the behavior feature contains the category "reminiscence", if the behavior feature is identified as containing the category "reminiscence", the songs corresponding to the category "reminiscence" can be pushed to the smart device for playing.

In this embodiment, based on the aforementioned embodiments, for each user identification, the behavior feature of the user having the user identification is determined according to the user behavior data associated with the user identification, and the information is pushed to the user according to the behavior feature. In this way, the voiceprint feature can be determined as the user identification associated with the smart device without specified operations of the user, thereby increasing convenience of using the voiceprint feature, and further the personalized information can be pushed to the user according to the behavior feature of the user, thereby improving the user experience.

Fifth Embodiment

Figure 5:
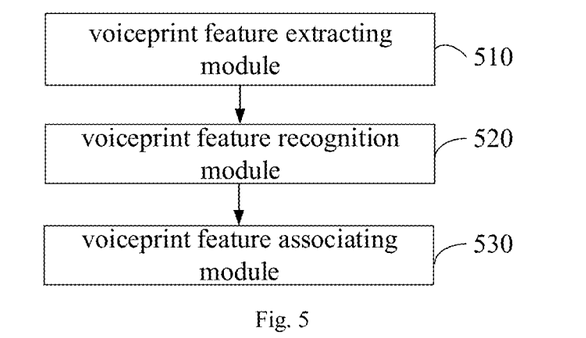
FIG. 5 is a block diagram of a voiceprint registration apparatus according to a fifth embodiment of the present disclosure.

FIG. 5 is a block diagram of a voiceprint registration apparatus according to the fifth embodiment of the present disclosure. As illustrated in FIG. 5, the apparatus may include a voiceprint feature extracting module 510, a voiceprint feature recognition module 520 and a voiceprint feature associating module 530.

The voiceprint feature extracting module 510 is configured to acquire present speech information collected by a smart device and to extract a present voiceprint feature of the present speech information.

The voiceprint feature recognition module 520 is configured to determine whether the present voiceprint feature is a voiceprint feature associated with the smart device.

The voiceprint feature associating module 530 is configured to determine the present voiceprint feature as a user identification associated with the smart device to determine the present voiceprint feature as the voiceprint feature associated with the smart device, in response to determining that the present voiceprint feature is not a voiceprint feature associated with the smart device.

Further, the voiceprint feature associating module 530 is configured to determine whether a number of present user identifications associated with the smart device is less than a preset threshold; determine the present voiceprint feature as a new user identification associated with the smart device, in response to determining that a number of user identifications associated with the smart device is less than a preset threshold; and change a present user identification associated with the smart device and with minimum user behavior data to the present voiceprint feature and clearing the user behavior data associated with the present user identification, in response to determining that a number of user identifications associated with the smart device is not less than a preset threshold.

Further, the apparatus may further include a user attribute acquiring module, configured to extract user attribute information according to the voiceprint feature associated with the user identification; and a first information pushing module, configured to push information to a user according to the user attribute information.

Further, the apparatus may further include a behavior feature acquiring module, configured to, for each user identification, determine a behavior feature of a user of the user identification according to the user behavior data associated with the user identification; and a second information pushing module, configured to push information to the user according to the behavior feature.

In this embodiment of the present disclosure, the present speech information collected by the smart device is acquired, the present voiceprint feature is extracted from the present speech information, it is determined whether the present voiceprint feature is a voiceprint feature associated with the smart device, if no, the present voiceprint feature is determined as a user identification associated with the smart device to determine the present voiceprint feature as the voiceprint feature associated with the smart device. In this way, the voiceprint feature can be determined as the user identification associated with the smart device without specified operations of the user, thus increasing convenience of using the voiceprint feature.

The apparatus can execute the method according to any of the embodiments of the present disclosure, and has corresponding functional modules and advantageous effect of the method embodiments.

Sixth Embodiment

Figure 6:
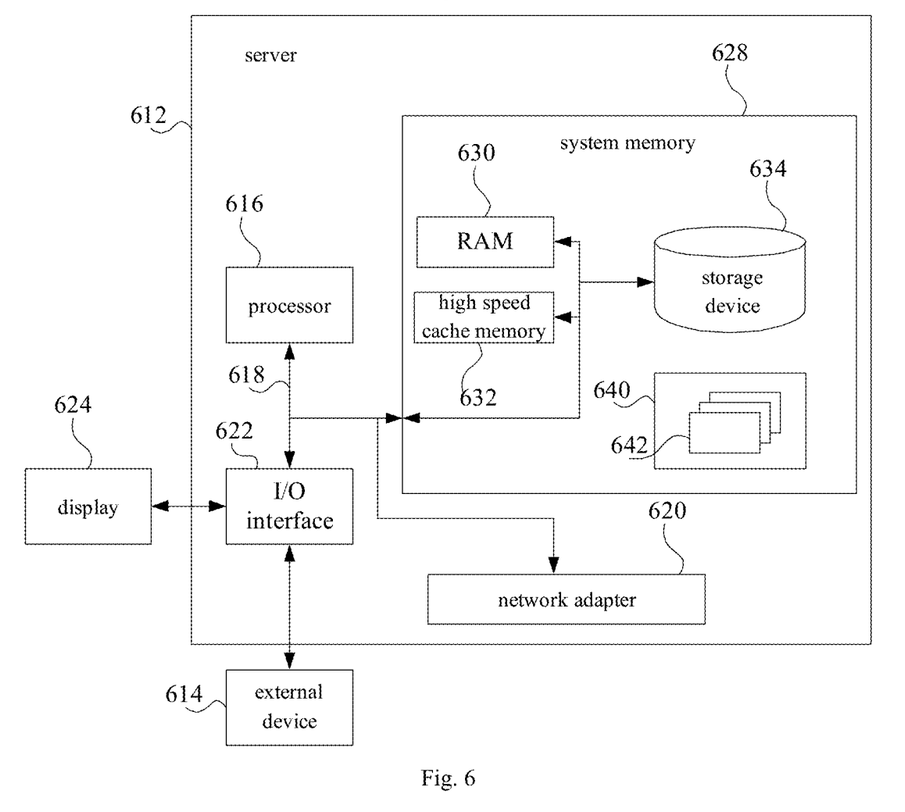
FIG. 6 is a block diagram of a server according to a sixth embodiment of the present disclosure.

FIG. 6 is a block diagram of a server according to the sixth embodiment of the present disclosure. FIG. 6 illustrates a block diagram of a server 612 applicable to implement the present disclosure. The server 612 illustrated in FIG. 6 is merely exemplary, and cannot be interpreted as a limitation on the function and application scope of the embodiments of the present disclosure.

As illustrated in FIG. 6, the server 612 is implemented in a form of a general computing device. The components of the server 612 include, but are not limited to, one or more processors 616, a system memory 628, a bus 618 connected to various system components, such as the system memory 628, the processor 616.

The bus 618 represents one or more of any of several types of bus structures, including a memory bus or a memory controller, a peripheral bus, an accelerated graphics port, a processor 616, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The server 612 typically includes a variety of computer system readable media. These media may be any available media accessible by the server 612 and includes both volatile and non-volatile media, removable and non-removable media.

The system memory 628 may include a computer system readable medium in the form of volatile memory, such as a random access memory (hereinafter referred to as RAM) 630 and/or a high speed cache memory 632. The server 612 may further include other removable or non-removable, volatile or non-volatile computer system storage media. By way of example only, the storage device 634 may be configured to read and write a non-removable and non-volatile magnetic media (not shown in FIG. 7, commonly referred to as a "hard drive"). Although not shown in FIG. 6, a magnetic disk driver for reading from and writing to a removable and non-volatile magnetic disk (such as "floppy disk") and a disk driver for reading from and writing to a removable and non-volatile optical disk (such as compact disk read only memory (hereinafter referred to as CD-ROM), Digital Video Disc Read Only Memory (hereinafter referred to as DVD-ROM) or other optical media can be provided. In these cases, each driver may be connected to the bus 618 via one or more data medium interfaces. The memory 628 may include at least one program product. The program product has a set (such as, at least one) of program modules configured to perform the functions of various embodiments of the present disclosure.

A program/utility 640 having a set (at least one) of the program modules 642 may be stored in, for example, the memory 628. The program modules 642 include but are not limited to, an operating system, one or more application programs, other programs modules, and program data. Each of these examples, or some combination thereof, may include an implementation of a network environment. The program modules 642 generally perform the functions and/or methods in the embodiments described herein.

The server 612 may also communicate with one or more external devices 614 (such as, a keyboard, a pointing device, a display 624, etc.). Furthermore, the server 612 may also communicate with one or more devices enabling a user to interact with the server 612 and/or other devices (such as a network card, modem, etc.) enabling the server 612 to communicate with one or more computer devices. This communication can be performed via the input/output (I/O) interface 622. Also, the server 612 may communicate with one or more networks (such as a local area network (hereafter referred to as LAN), a wide area network (hereafter referred to as WAN) and/or a public network such as an Internet) through a network adapter 620. As shown in FIG. 6, the network adapter 620 communicates with other modules of the server 612 over the bus 18. It should be understood that, although not shown in FIG. 6, other hardware and/or software modules may be used in conjunction with the server 612. The hardware and/or software includes, but is not limited to, microcode, device drivers, redundant processing units, external disk drive arrays, RAID systems, tape drive and data backup storage system.

The processor 616 is configured to execute various functional applications and data processing by running programs stored in the system memory 628, for example, implementing the voiceprint registration method provided in embodiments of the present disclosure. The method includes: acquiring present speech information collected by a smart device; extracting a present voiceprint feature of the present speech information; determining whether the present voiceprint feature is a voiceprint feature associated with the smart device; and determining the present voiceprint feature as a user identification associated with the smart device to determine the present voiceprint feature as the voiceprint feature associated with the smart device, in response to determining that the present voiceprint feature is not the voiceprint feature associated with the smart device.

Seventh Embodiment

The seventh embodiment of the present disclosure further provides a computer readable storage medium including a computer program. When the computer program is executed by a processor, the processor is configured to perform the voiceprint registration method provided in embodiments of the present disclosure. The method includes: acquiring present speech information collected by a smart device; extracting a present voiceprint feature of the present speech information; determining whether the present voiceprint feature is a voiceprint feature associated with the smart device; and determining the present voiceprint feature as a user identification associated with the smart device to determine the present voiceprint feature as the voiceprint feature associated with the smart device, in response to determining that the present voiceprint feature is not the voiceprint feature associated with the smart device.

The above computer storage medium may adopt any combination of one or more computer readable medium(s). The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. More specific examples (a non-exhaustive list) of the computer readable storage medium include: an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing a program. The program may be used by or in connection with an instruction executed system, apparatus or device.

The computer readable signal medium may include a data signal propagating in baseband or as part of a carrier wave, which carries a computer readable program code. Such propagated data signal may take any of a variety of forms, including but not limited to an electromagnetic signal, an optical signal, or any suitable combination thereof. The computer readable signal medium may also be any computer readable medium other than the computer readable storage medium, which may send, propagate, or transport a program used by or in connection with an instruction executed system, apparatus or device.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C ++, as well as conventional Procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

It should be illustrated that, explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:
1. A voiceprint registration method, comprising:
    acquiring present speech information collected by a smart device;
    extracting a present voiceprint feature of the present speech information;
    determining whether the present voiceprint feature is a voiceprint feature associated with the smart device; and
    determining the present voiceprint feature as a user identification associated with the smart device to determine the present voiceprint feature as the voiceprint feature associated with the smart device, in response to deter- mining that the present voiceprint feature is not the voiceprint feature associated with the smart device;
wherein determining the present voiceprint feature as the user identification associated with the smart device comprises:
determining whether a number of user identifications associated with the smart device is less than a preset threshold;
determining the present voiceprint feature as a new user identification associated with the smart device, in response to determining that the number of user identifications associated with the smart device is less than the preset threshold; and
replacing a user identification associated with the smart device and with minimum user behavior data by the present voiceprint feature and clearing the user behavior data associated with the replaced user identification, in response to determining that the number of user identifications associated with the smart device is not less than the preset threshold.

2. The method according to claim 1, wherein extracting the present voiceprint feature of the present speech information comprises:
quantizing and sampling the present speech information to acquire a digital speech signal;
performing denoising and filtering on the digital speech signal to produce a processed speech signal; and
performing a feature extraction on the processed speech signal using a predetermined algorithm to acquire the present voiceprint feature of the present speech information.

3. The method according to claim 1, wherein determining whether the present voiceprint feature is the voiceprint feature associated with the smart device comprises:
matching and identifying the present voiceprint feature according to voiceprint features associated with the smart device;
when the present voiceprint feature is successfully identified and matched with any voiceprint feature associated with the smart device, determining that the present voiceprint feature is the voiceprint feature associated with the smart device; and
when the present voiceprint feature is not identified and matched with each voiceprint feature associated with the smart device, determining that the present voiceprint feature is not the voiceprint feature associated with the smart device.

4. The method according to claim 3, wherein matching and identifying the present voiceprint feature according to the voiceprint features associated with the smart device comprises:
matching and identifying the present voiceprint feature by comparing the present voiceprint feature with an established voiceprint feature model of each of the voiceprint features associated with the smart device.

5. The method according to claim 3, wherein matching and identifying the present voiceprint feature according to the voiceprint features associated with the smart device comprises:
matching and identifying the present voiceprint feature according to the voiceprint features associated with the smart device using a neutral network algorithm.

6. The method according to claim 1, further comprising:
establishing a voiceprint feature model corresponding to the present voiceprint feature.

7. The method according to claim 1, after determining the present voiceprint feature as the user identification associated with the smart device to determine the present voiceprint feature as the voiceprint feature associated with the smart device, further comprising:
extracting user attribute information according to the voiceprint feature associated with the user identification; and
pushing information to a user according to the user attribute information.

8. The method according to claim 7, wherein extracting the user attribute information according to the voiceprint feature associated with the user identification comprises:
identifying the voiceprint feature associated with the user identification to acquire an identification result; and
adding the identification result in the user attribute information corresponding to the voiceprint feature.

9. The method according to claim 7, wherein pushing the information to the user according to the user attribute information comprises:
searching for the information to be pushed corresponding to the user attribute information in a pre-established database storing the user attribute information and the information to be pushed; and
pushing the information to be pushed corresponding to the user attribute information to a smart device for displaying or broadcasting.

10. The method according to claim 1, after determining the present voiceprint feature as the user identification associated with the smart device to determine the present voiceprint feature as the voiceprint feature associated with the smart device, further comprising:
for each user identification, determining a behavior feature of a user corresponding to the user identification according to the user behavior data associated with the user identification; and
pushing information to the user according to the behavior feature.

11. The method according to claim 10, wherein determining the behavior feature of the user corresponding to the user identification according to the user behavior data associated with the user identification comprises:
recording operations of the user in real time;
determining user behavior data according to the operations of the user; and
determining the behavior feature according to user behavior data and a pre-established user preference model.

12. A server, comprising:
one or more processors, a memory having one or more programs stored thereon;
wherein when the one or more programs are executed by the one or more processors, the one or more processors are caused to perform the method comprising:
acquiring present speech information collected by a smart device;
extracting a present voiceprint feature of the present speech information;
determining whether the present voiceprint feature is a voiceprint feature associated with the smart device; and
determining the present voiceprint feature as a user identification associated with the smart device to determine the present voiceprint feature as the voiceprint feature associated with the smart device, in response to determining that the present voiceprint feature is not the voiceprint feature associated with the smart device;
wherein determining the present voiceprint feature as the user identification associated with the smart device comprises:

determining whether a number of user identifications associated with the smart device is less than a preset threshold;

determining the present voiceprint feature as a new user identification associated with the smart device, in response to determining that the number of user identifications associated with the smart device is less than the preset threshold; and replacing a user identification associated with the smart device and with minimum user behavior data by the present voiceprint feature and clearing the user behavior data associated with the replaced user identification, in response to determining that the number of user identifications associated with the smart device is not less than the preset threshold.

13. The server according to claim 12, after determining the present voiceprint feature as the user identification associated with the smart device to determine the present voiceprint feature as the voiceprint feature associated with the smart device, further comprising:

extracting user attribute information according to the voiceprint feature associated with the user identification; and pushing information to a user according to the user attribute information.

14. The server according to claim 13, wherein extracting the user attribute information according to the voiceprint feature associated with the user identification comprises:

identifying the voiceprint feature associated with the user identification to acquire an identification result; and adding the identification result in the user attribute information corresponding to the voiceprint feature.

15. The server according to claim 13, wherein pushing the information to the user according to the user attribute information comprises:

searching for the information to be pushed corresponding to the user attribute information in a pre-established database storing the user attribute information and the information to be pushed; and pushing the information to be pushed corresponding to the user attribute information to a smart device for displaying or broadcasting.

16. The server according to claim 12, after determining the present voiceprint feature as the user identification associated with the smart device to determine the present voiceprint feature as the voiceprint feature associated with the smart device, further comprising:

for each user identification, determining a behavior feature of a user corresponding to the user identification according to the user behavior data associated with the user identification; and pushing information to the user according to the behavior feature.

17. The server according to claim 16, wherein determining the behavior feature of the user corresponding to the user identification according to the user behavior data associated with the user identification comprises:

recording operations of the user in real time;

determining user behavior data according to the operations of the user; and determining the behavior feature according to user behavior data and a pre-established user preference model.

18. A non-transitory computer readable storage medium having computer programs, that when executed by a processor, cause the processor to perform the method comprising:

acquiring present speech information collected by a smart device;

extracting a present voiceprint feature of the present speech information;

determining whether the present voiceprint feature is a voiceprint feature associated with the smart device; and determining the present voiceprint feature as a user identification associated with the smart device to determine the present voiceprint feature as the voiceprint feature associated with the smart device, in response to determining that the present voiceprint feature is not the voiceprint feature associated with the smart device;

wherein determining the present voiceprint feature as the user identification associated with the smart device comprises:

determining whether a number of user identifications associated with the smart device is less than a preset threshold;

determining the present voiceprint feature as a new user identification associated with the smart device, in response to determining that the number of user identifications associated with the smart device is less than the preset threshold; and replacing a user identification associated with the smart device and with minimum user behavior data by the present voiceprint feature and clearing the user behavior data associated with the replaced user identification, in response to determining that the number of user identifications associated with the smart device is not less than the preset threshold.

* * * * *